US011678961B2

(12) United States Patent
Jackson et al.

(10) Patent No.: US 11,678,961 B2
(45) Date of Patent: Jun. 20, 2023

(54) PACKAGING FOR LENGTHS OF DENTAL FLOSS

(71) Applicant: The Autoflosser LLC, Barrington, IL (US)

(72) Inventors: Thomas F. Jackson, Inverness, IL (US); Russell G. Kalbfeld, Naperville, IL (US)

(73) Assignee: The Autoflosser LLC, Barrington ( * ) Notice: Subject to any disclaimer, the term of this patent is extended or adjusted under 35 U.S.C. 154(b) by 84 days.

(21) Appl. No.: 17/339,923

(22) Filed: Jun. 4, 2021

(65) Prior Publication Data

US 2022/0387152 A1    Dec. 8, 2022

(51) Int. Cl.
*A61C 15/04* (2006.01)

(52) U.S. Cl.
CPC ........ *A61C 15/043* (2013.01); *A61C 2202/00* (2013.01)

(58) Field of Classification Search
CPC .............. A61C 15/043; A61C 2202/00; A61B 2017/06152; A61B 17/06138
USPC ................................. 206/63.5, 63.3, 227, 380
See application file for complete search history.

(56) References Cited

U.S. PATENT DOCUMENTS

| | | | | |
|---|---|---|---|---|
| 1,375,015 A | * | 4/1921 | Reynolds ............... | B65D 73/00 206/388 |
| 2,692,676 A | | 10/1954 | Grover | |
| 3,094,209 A | * | 6/1963 | Krupp .................. | A61C 15/043 206/63.5 |
| 4,063,638 A | * | 12/1977 | Marwood ........ | A61B 17/06138 206/363 |
| 4,533,041 A | * | 8/1985 | Aday ............... | A61B 17/06138 206/388 |
| 4,700,833 A | * | 10/1987 | Smith .............. | A61B 17/06138 229/87.5 |
| 5,101,968 A | * | 4/1992 | Henderson ....... | A61B 17/06138 206/227 |
| 5,121,836 A | * | 6/1992 | Brown ............. | A61B 17/06138 206/63.3 |
| 5,271,494 A | * | 12/1993 | Odermatt ......... | A61B 17/06138 206/227 |
| 5,386,912 A | * | 2/1995 | Holzwarth ....... | A61B 17/06138 206/388 |

(Continued)

OTHER PUBLICATIONS

Photographs of Oral-B Superfloss Packaging, by Oral-B, on sale in the United States on Jun. 3, 2020.

*Primary Examiner* — Chun Hoi Cheung

(57) ABSTRACT

Packaging for individual strands of dental floss. The packaging may include a container defining a chamber having a dispensing portion. An insert is positioned in the chamber and includes a first panel defining a first edge and a second panel. The second panel defines a passage extending between its sides. The second panel also defines a second edge positioned on an opposite side of the passage as the first edge. The package also includes a serpentine floss guide path defined by the container, the first panel, and the second panel. The serpentine floss guide path extends from the dispensing portion, along one side of the first panel, around and over the first edge to one side of the second panel, through the passage, and around and over the second edge. Strands of floss extend along the serpentine floss path and may be removed from the container one at a time by grasping and pulling the end positioned at the dispensing portion.

16 Claims, 5 Drawing Sheets

(56) References Cited

U.S. PATENT DOCUMENTS

| | | | | |
|---|---|---|---|---|
| 5,427,243 A * | 6/1995 | Roshdy | ............... | A61N 1/0587 |
| | | | | 206/380 |
| 5,433,315 A * | 7/1995 | Brandau | .......... | A61B 17/06138 |
| | | | | 206/382 |
| 5,435,438 A * | 7/1995 | Scanlon | ........... | A61B 17/06138 |
| | | | | 206/227 |
| 5,555,976 A * | 9/1996 | Pernot | .............. | A61B 17/06138 |
| | | | | 206/227 |
| 5,566,692 A * | 10/1996 | Thornton | ............. | A61C 15/043 |
| | | | | 132/324 |
| 5,601,185 A * | 2/1997 | Behring | ........... | A61B 17/06138 |
| | | | | 206/380 |
| 5,692,602 A * | 12/1997 | Bordignon | ....... | A61B 17/06138 |
| | | | | 206/227 |
| 5,732,816 A * | 3/1998 | Cerwin | ............ | A61B 17/06138 |
| | | | | 206/382 |
| 5,871,089 A * | 2/1999 | Odermatt | ......... | A61B 17/06138 |
| | | | | 206/227 |
| 5,896,982 A * | 4/1999 | Surcin | .............. | A61B 17/06138 |
| | | | | 206/784 |
| 6,029,806 A * | 2/2000 | Cerwin | ............ | A61B 17/06138 |
| | | | | 53/118 |
| 6,260,696 B1 * | 7/2001 | Braginsky | ........ | A61B 17/06133 |
| | | | | 206/380 |
| 6,659,270 B2 * | 12/2003 | Williamson, IV | ........................... | |
| | | | | A61B 17/06138 |
| | | | | 206/380 |
| 6,739,450 B2 * | 5/2004 | Roshdy | ........... | A61B 17/06138 |
| | | | | 206/227 |
| 6,938,755 B2 * | 9/2005 | Braginsky | ........ | A61B 17/06138 |
| | | | | 206/363 |
| 7,600,634 B2 * | 10/2009 | Malinowski | ..... | A61B 17/06138 |
| | | | | 206/380 |

\* cited by examiner

PACKAGING FOR LENGTHS OF DENTAL FLOSS

BACKGROUND

The present disclosure relates to packaging and, more specifically, to packaging configured to store, protect, and dispense individual strands of dental floss.

Although most dental floss comes packaged on a spool that allows the end user to select and cut the length of floss he/she desires to use, some types of dental floss, such as multi-texture dental floss, are often sold in pre-cut lengths. Packaging pre-cut lengths of dental floss in an efficient and effective manner presents a challenge because pre-cut lengths of floss positioned in close proximity have a tendency to become tangled or knotted when one is moved relative to the others, for example when a user tries to remove one length of floss from the package.

SUMMARY

In some aspects, a package for a plurality of strands of floss is provided and includes a container defining a chamber, the chamber having a dispensing portion. A first panel is positioned within the chamber and has an A side, a B side opposite the A side, and a first edge spaced away from the dispensing portion. A second panel is positioned within the chamber and has a C side and a D side, the D side opposite the C side and facing the B side of the first panel. The second panel defines a passage extending between the C side and the D side. The second panel also defines a second edge positioned on an opposite side of the passage as the first edge. The package also includes a serpentine floss guide path defined by the container, the first panel, and the second panel. The serpentine floss guide path extends from the dispensing portion, along the A side, around and over the first edge from the A side of the first panel to the C side of the second panel, through the passage from the C side of the second panel to the D side of the second panel, and around and over the second edge.

The first panel may define a gathering member between the first edge and the dispensing portion, and the serpentine floss guide path may extend through the gathering member. The package may also include a plurality of lengths of floss extending along the serpentine floss guide path, each length of floss having an end, and the gathering member including an opening through which each of the plurality of lengths of floss passes. The first panel and the second panel may be coupled to one another via a fold line that defines the first edge. The package also includes a third panel positioned within the chamber and having an E side and an F side, the E side facing the C side and the F side opposite the E side, where the floss guide path extends from the D side and around the second edge to the F side. The first panel, second panel, and third panel may be arranged generally in a Z-configuration. The second panel and the third panel may be coupled to one another via a fold line that defines the second edge. The first panel and the second panel may each be generally rectangular and may have a pair of long edges and a pair of short edges, and the first edge may be a short edge and the second edge may be a short edge.

In other aspects, a package is provided and includes a container defining a chamber, the chamber having a dispensing portion, and an insert positioned within the chamber. The insert includes a first panel having an A side, a B side opposite the A side, and a first edge spaced away from the dispensing portion. The insert also includes a second panel having a C side and a D side, the D side opposite the C side and facing the B side of the first panel. The second panel defines a passage extending between the C side and the D side, and defines a second edge positioned on an opposite side of the passage as the first edge. A serpentine floss guide path is defined by the container, the first panel, and the second panel. The serpentine floss guide path extends from the dispensing portion, along the A side, around and over the first edge from the A side of the first panel to the C side of the second panel, through the passage from the C side of the second panel to the D side of the second panel, and around and over the second edge. A plurality of pre-cut lengths of floss are carried by the insert and positioned in the chamber. Each length of floss extends along the serpentine floss guide path and has an end positioned at the dispensing portion.

The first panel may define a gathering member between the first edge and the dispensing portion, and the serpentine floss guide path may extend through the gathering member. The gathering member may include an opening through which each of the plurality of lengths of floss passes. The first panel and the second panel may be coupled to one another via a fold line that defines the first edge. The insert may include a third panel having an E side and an F side, the E side facing the C side and the F side opposite the E side, and the floss guide path may extend from the D side and around the second edge to the F side. The first panel, second panel, and third panel may be arranged generally in a Z-configuration. The second panel and the third panel may be coupled to one another via a fold line that defines the second edge. The first panel and the second panel may each be generally rectangular and may have a pair of long edges and a pair of short edges, and the first edge may be a short edge and the second edge may be a short edge.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
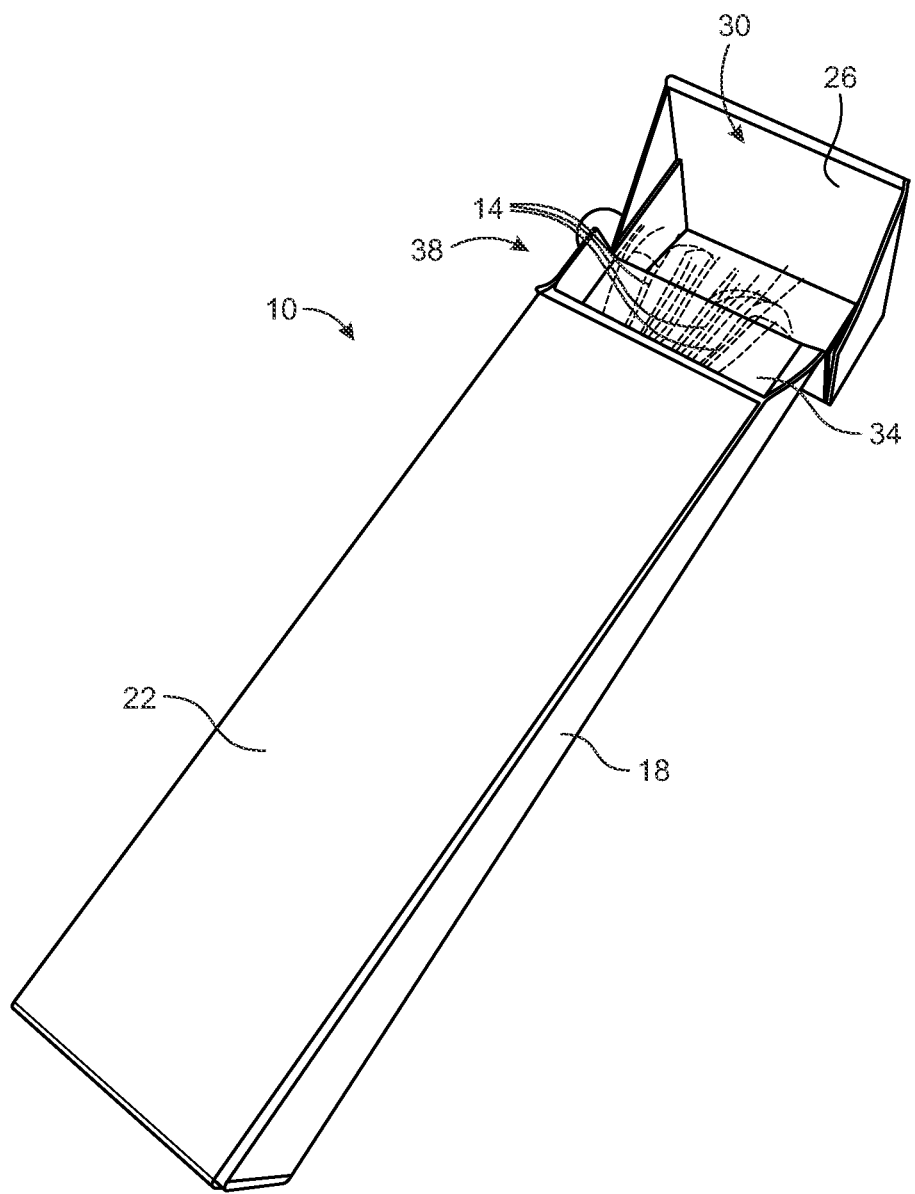
FIG. 1 is a perspective view of packaging for individual strands of floss.
Figure 2:
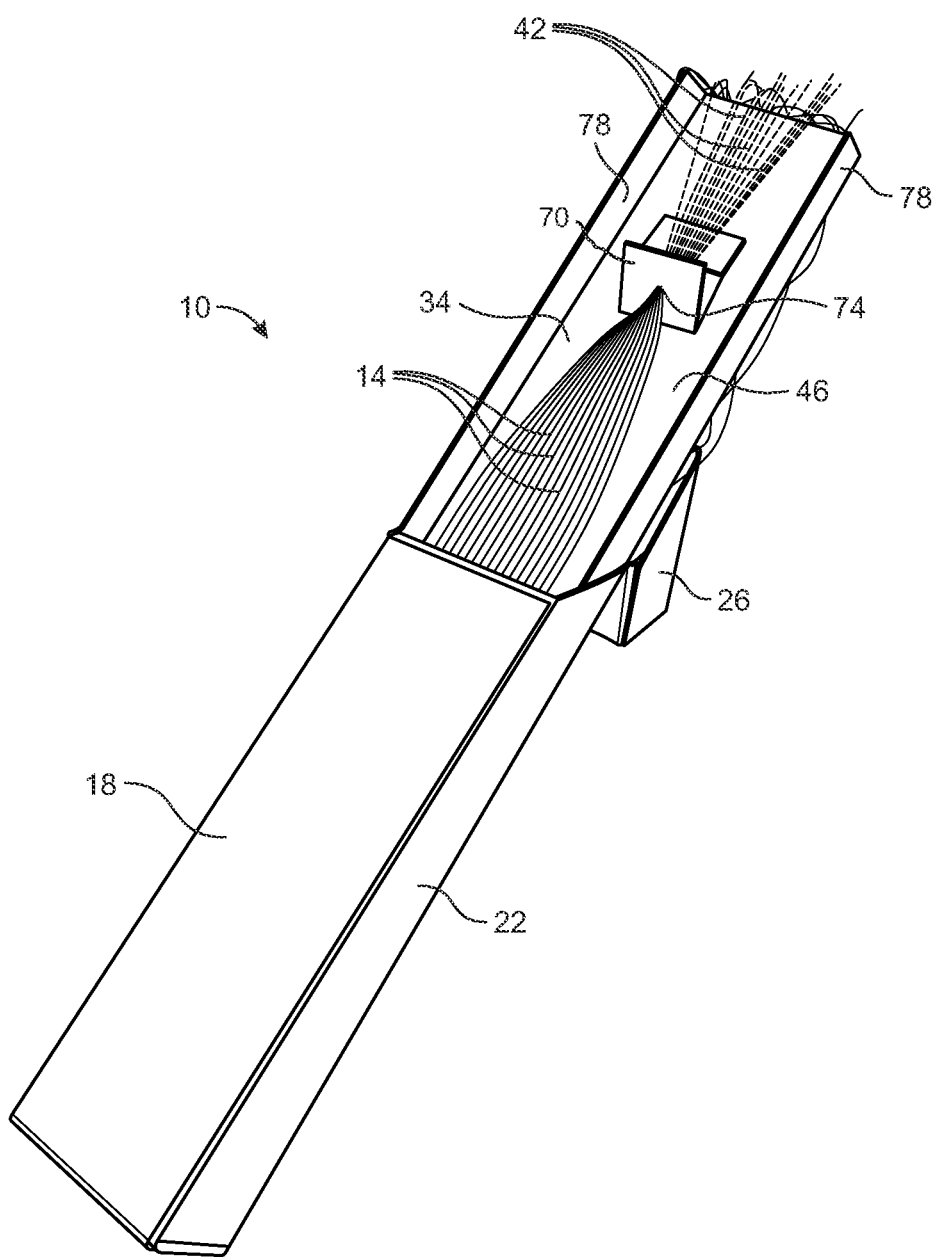
FIG. 2 is a perspective view of the packaging of FIG. 1 with an insert partially removed from a container.

FIGS. 1 and 2 illustrate a package 10 for storing, protecting, and dispensing pre-cut lengths of threadlike material, such as a plurality of lengths 14 of dental floss. The package 10 includes a container 18 having a body portion 22 and a lid portion 26 pivotally connected with the body portion 22. The body portion defines a chamber 30 and the chamber 30 receives an insert 34 that holds the lengths 14 in a manner described below. The chamber 30 includes a dispensing portion 38 where ends 42 of the lengths 14 are splayed into a fan-shape for easy grasping and removal of the length by a user. The lid portion 26 is movable between an open position that exposes the dispensing portion and a closed portion 26 that covers the dispensing portion.

Figure 3:
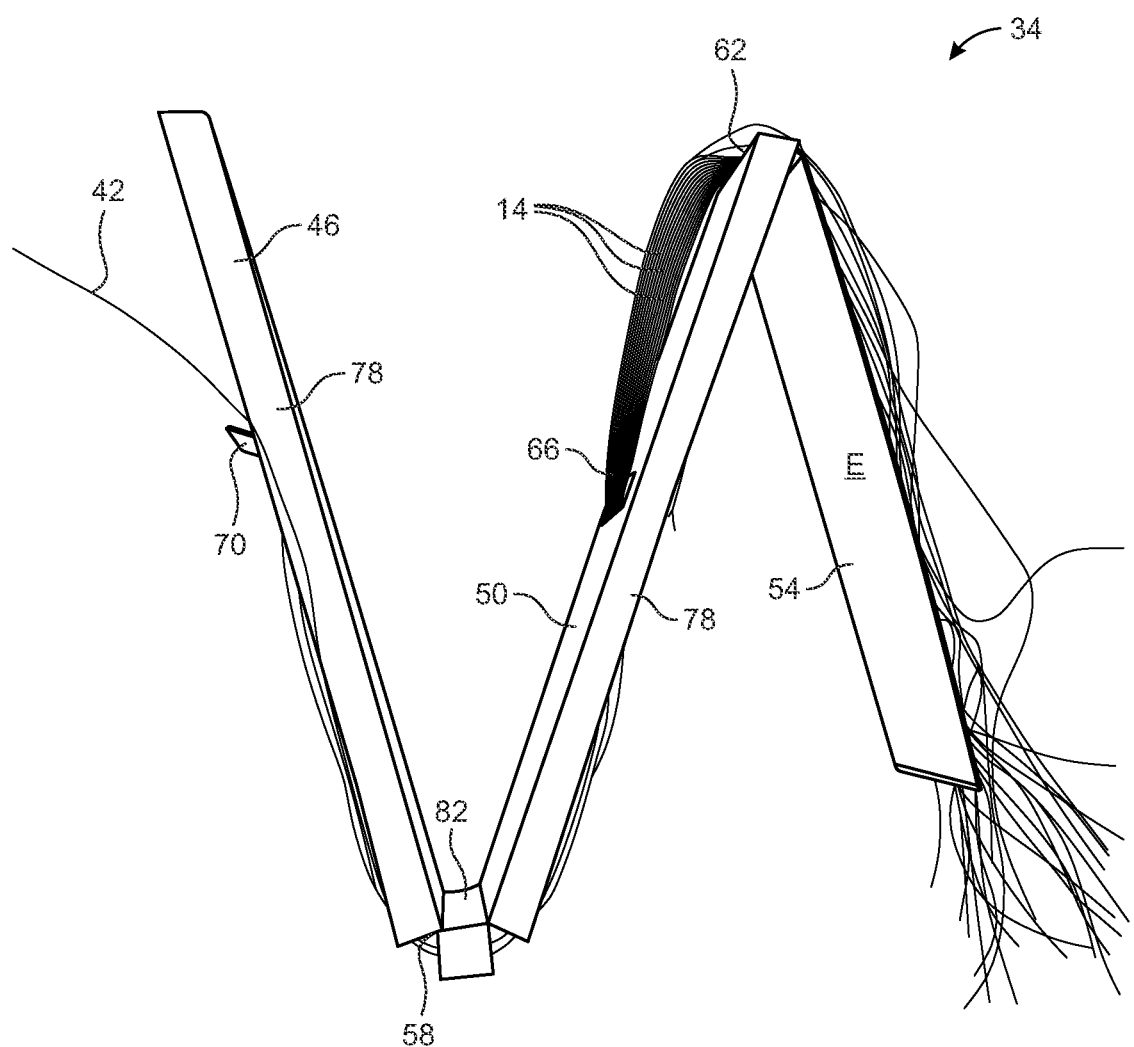
FIG. 3 is a side view of the insert of FIG. 2 in a partially expanded Z-shaped configuration.
Figure 4:
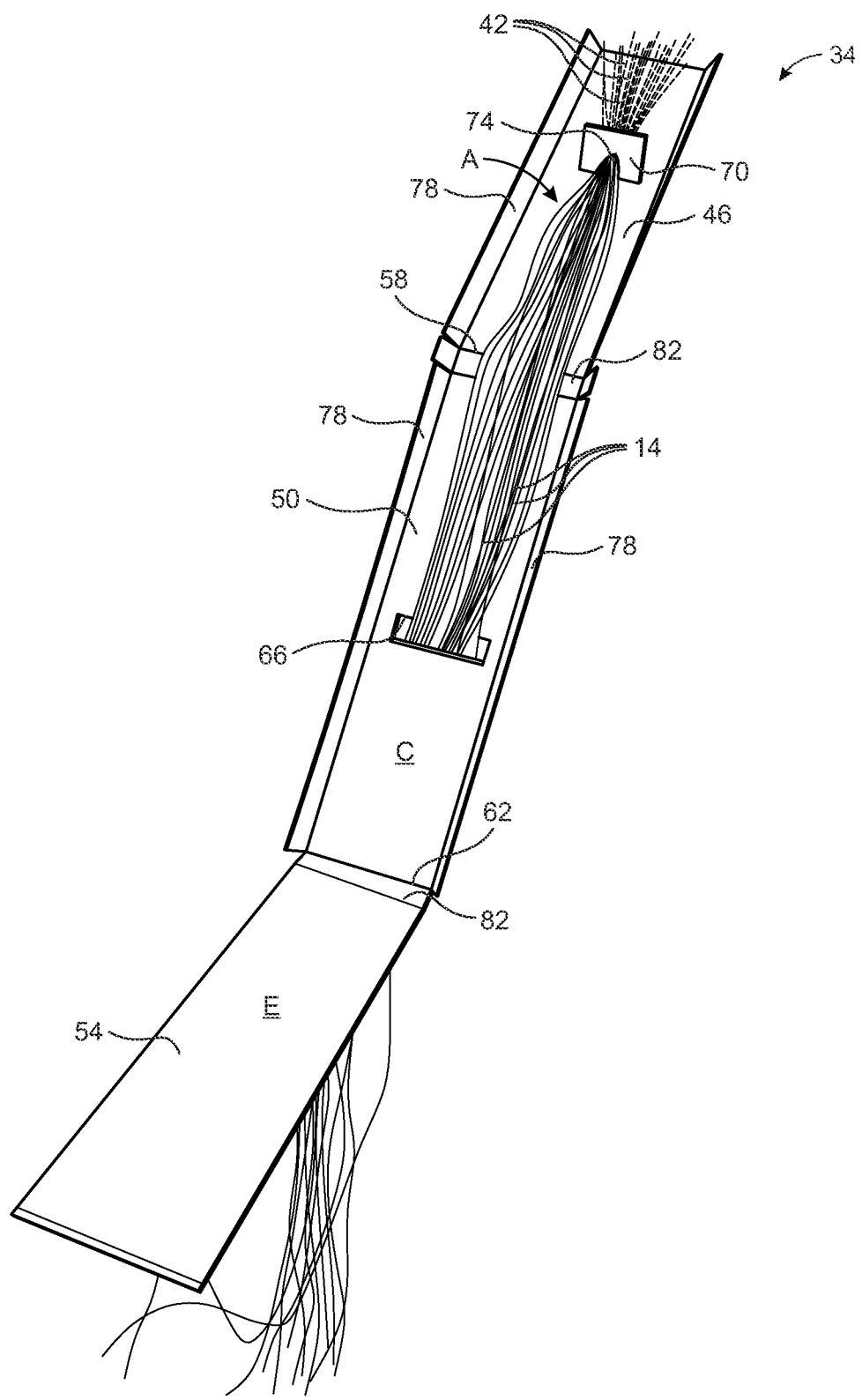
FIG. 4 is a perspective view of a first side of the insert of FIG. 2 in an expanded configuration.
Figure 5:
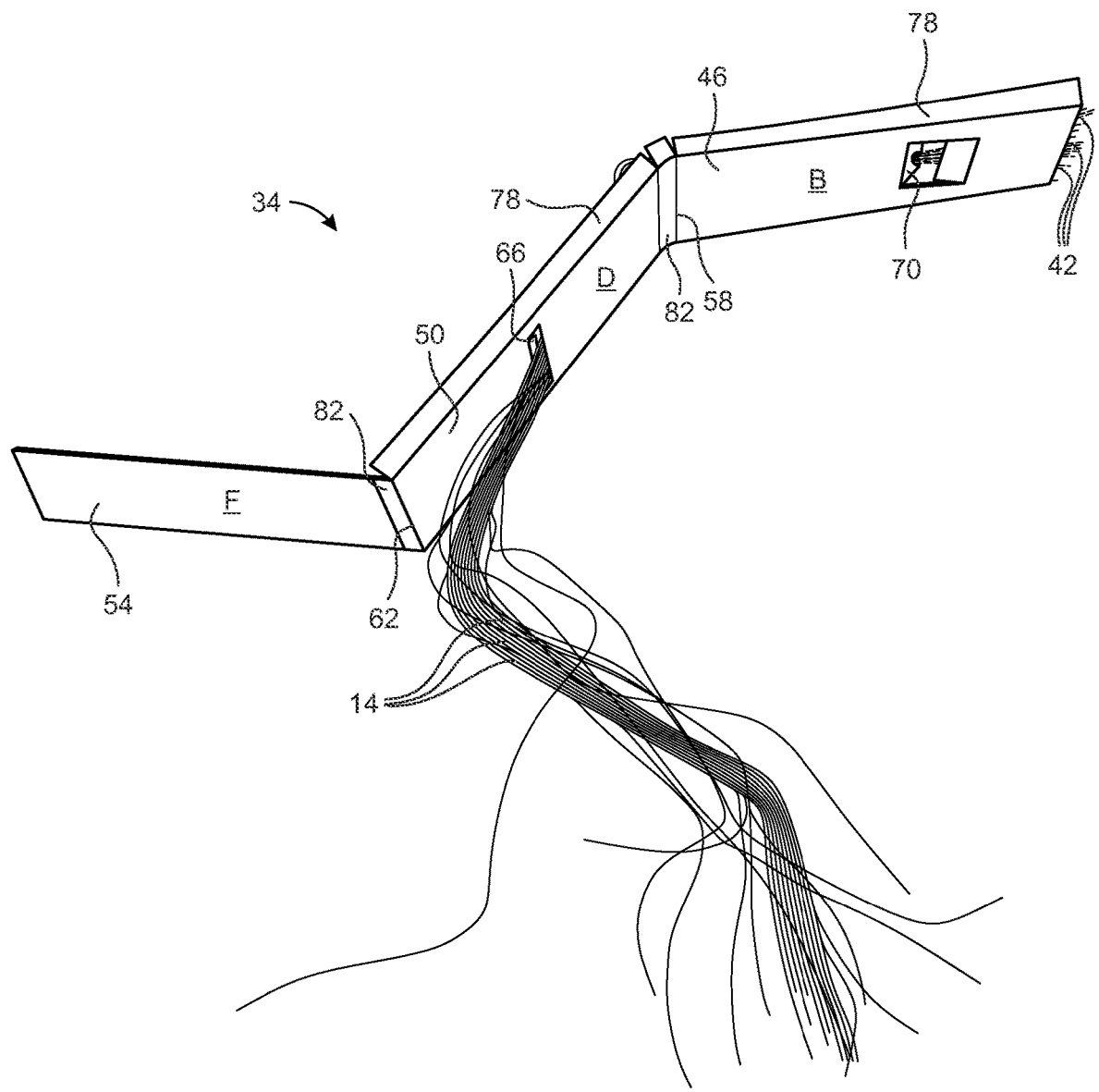
FIG. 5 is a perspective view of a second side of the insert of FIG. 2 in the expanded configuration.

Referring also to FIGS. 3-5, the insert 34 includes 3 panels that, when inserted into the chamber 30, are folded into a substantially Z-shaped configuration. More specifically, the insert 34 includes a first panel 46, a second panel 50, and a third panel 54. Each panel 46, 50, 54 is substantially rectangular and includes a pair of long edges and a pair of short edges. The first panel has an A side (FIG. 4) and a B side (FIG. 5) opposite the A side, the second panel 50 has a C side (FIG. 4) and a D side (FIG. 5) opposite the C side, and the third panel 54 has an E side (FIG. 4) and an F side (FIG. 5) opposite the E side. When the insert 34 is inserted into the chamber 30 and in the Z-shaped configuration, the D side of the second panel 50 faces the B side of the first panel 46, and the E side of the third panel 54 faces the C side of the second panel 50.

The first panel 46 is joined to the second panel 50 along a fold line that coincides with a first edge 58 defined by the first panel 46, the first edge 58 being one of the short edges of the first panel 46. When the insert 34 is positioned within the chamber 30, the first edge 58 is positioned inside the chamber 30 and is spaced away from the dispensing portion 38. In some embodiments, the first edge 58 is positioned at an opposite end of the chamber as the dispensing portion 38. The second panel 50 is joined to the third panel 54 along a fold line that coincides with a second edge 62 defined by the second panel 50, the second edge 62 being one of the short edges of the second panel 50. The second panel 50 also defines a passage 66 that extends between the C side and the D side. The passage 66 is located on the second panel 50 between the first edge 58 and the second edge 62 such that the second edge 62 is positioned on an opposite side of the passage 66 as the first edge 58.

When the insert 34 is positioned within the chamber 30, the insert and the container 18 cooperate to define a serpentine floss guide path along which the lengths 14 of dental floss extend. More specifically, the serpentine floss guide path is defined by the container 18, the first panel 46, the second panel 50, and the third panel 54, although some embodiments may forego the use of the third panel 54 depending upon, among other things, the length and/or configuration of the lengths 14 of dental floss.

As used in this paragraph the directions "up" and "down" are with reference to the orientation of FIG. 3. As best shown in FIGS. 1 and 3, the serpentine floss guide path extends from the dispensing portion 38, downwardly along the A side of the first panel 46 until it reaches the first edge 58, at which point it passes around and over the first edge 58, thereby transitioning from the A side of the first panel 46 to the D side of the second panel 50. The serpentine floss guide path then extends upwardly along the D side until it reaches the passage 66, at which point the floss guide path travels through the passage from the D side of the second panel 50 to the C side of the second panel 50. The floss guide path then extends upwardly along the C side of the second panel until it reaches the second edge 62, at which point it passes around and over the second edge 62, thereby transitioning from the C side of the second panel to the D side of the second panel. Note also that in configurations that include the third panel 54, when the floss guide path passes around and over the second edge 62, it also transitions from the C side of the second panel to the F side of the third panel 54. From the second edge 62, the floss guide path extends downwardly and terminates at a location along the length of the chamber between the first edge 58 and the second edge 62.

In some embodiments, including the illustrated exemplary embodiment, the first panel 46 may include or define a gathering member 70 positioned along the first panel 46 generally between the first edge 58 and the dispensing portion 38. In the illustrated configuration the gathering member 70 is formed by folding a portion of the first panel such that it extends outwardly and away from the A side. The gathering member 70 is provided with a hole, slit, or similar opening 74 and the ends 42 of the lengths 14 of floss are passed through the opening 74. In this regard, the floss guide path may extend through the opening 74 at a location along the guide path generally between the dispensing portion 38 and the first edge 58. As best shown in FIG. 2, the gathering member 70 functions to splay the ends 42 of the lengths 14 into the above-described fan shape at the dispensing portion 38 by causing the lengths 14 to converge at the opening 74, thereby causing the ends 42 to diverge away from one another as they extend toward the dispensing portion 38. In this way, it is made easier for a user to grasp a single end 42 at a time in order to remove the corresponding length 14 from the package 10.

In some embodiments, including the illustrated exemplary embodiment, one or more of the first, second, and third panels 46, 50, 54 may include side guides 78 in the form of bent or upturned portions along long edges of the respective first, second, or third panel 46, 50, 54. In the illustrated construction, both the first panel 46 and the second panel 50 are provided with side guides 78. The side guides 78 function to retain the lengths 14 of dental floss within the floss guide path by providing a side barrier that engages the interior walls of the container 18.

As best shown in FIG. 4, first panel 46 may include a joining portion 82 between the first panel 46 and the second panel 50, and the second panel 50 may also or alternatively include a joining portion 82 between the second panel 50 and the third panel 54. The joining portion 82 may include a fold line in addition to the fold lines that define the first edge 58 and the second edge 62 in order to space the first panel 46 from the second panel 50 and/or to space the second panel 50 from the third panel 54 in order to create additional clearance between the panels 46, 50, 54 and the lengths of floss 14 along portions of the serpentine guide path.

During assembly of the packaging 10, the lengths 14 of dental floss are arranged on the insert 34 along the serpentine floss guide path. With the insert 34 unfolded in a manner similar to that shown in FIGS. 4 and 5, the ends 42 may be passed through the passage 66 from the D side to the C side, and then through the opening 74 of the gathering member 70. The insert 34 may then be folded into the Z-configuration (see FIG. 3) and inserted into the body portion 22 of the container 18, such that the lengths 14 of floss are carried by the insert 34 and positioned within the chamber 30. The lid portion 26 may be closed and the package 10 may be shrink wrapped or otherwise encased or enclosed for shipping, display, and sale.

In use, a user may open the lid portion 26 to expose the dispensing portion 38 with the ends 42 of floss splayed out in the shape. The user may then select and grasp the end 42 of one of the lengths 14 of dental floss and begin pulling the length 14 from the package. As the user pulls the length 14 from the package, the length 14 being pulled travels along the serpentine floss guide path—which is to say over the second edge 62, through the passage 66, over the first edge 58, and through the opening 74 in the gathering member 70. By virtue of the illustrated configuration of the serpentine floss guide path, the length 14 of dental floss being removed from the package does not contact itself at any location along the path because at each location along the path the first panel 46, second panel 50, and optional third panel 54 are positioned between portions of the length 14 of dental floss that are traveling in opposite directions. This feature of the package 10 reduces the likelihood of snags or tangles and allows for a smooth removal of the length 14 of dental floss selected by the user. Moreover, the configuration of the serpentine floss guide path also restrains the lengths 14 of dental floss not being removed to ensure those lengths 14 remain secured and in place within the package 10. More specifically, because each length 14 extends through the opening 74 in the gathering member 70, over and around the first edge 58, through the passage 66, and over and around the section edge 62, the resistance provided by the configuration of the serpentine floss guide path is generally sufficient to prevent the unselected lengths 14 of floss not selected by the user from being removed, snagged, or otherwise displaced due to friction between the unselected lengths 14 and the user-selected length 14 as the user-selected length 14 of floss is pulled along the serpentine floss guide path and removed from the package 10. Thus, the configuration of the package 10, including the insert 34, first panel 46, second panel 50, and optional third panel 54, allows for individual lengths 14 of dental floss to be removed one at a time from the package substantially without disturbing the other lengths 14 of dental floss until all lengths 14 of dental floss have been removed from the package.

Various features of the invention are set forth in the following claims.

What is claimed is:

1. A package for a plurality of strands of floss, the package comprising:
   a container defining a chamber, the chamber having a dispensing portion;
   a first panel positioned within the chamber and having an A side, a B side opposite the A side, and a first edge spaced away from the dispensing portion;
   a second panel positioned within the chamber and having a C side and a D side, the D side opposite the C side and facing the B side of the first panel, the second panel defining a passage extending between the C side and the D side, the second panel defining a second edge positioned on an opposite side of the passage as the first edge;
   a serpentine floss guide path defined by the container, the first panel, and the second panel, the serpentine floss guide path extending from the dispensing portion, along the A side, around and over the first edge from the A side of the first panel to the C side of the second panel, through the passage from the C side of the second panel to the D side of the second panel, and around and over the second edge; and
   a plurality of pre-cut lengths of floss carried by the first panel and the second panel and positioned in the chamber, each length of floss extending along the serpentine floss guide path and having an end positioned at the dispensing portion.

2. The package of claim 1, wherein the first panel defines a gathering member between the first edge and the dispensing portion, and wherein the serpentine floss guide path extends through the gathering member.

3. The package of claim 2, wherein the gathering member includes an opening through which each of the plurality of lengths of floss passes.

4. The package of claim 1, wherein the first panel and the second panel are coupled to one another via a fold line that defines the first edge.

5. The package of claim 1, further comprising a third panel positioned within the chamber and having an E side and an F side, the E side facing the C side and the F side opposite the E side, wherein the floss guide path extends from the D side and around the second edge to the F side.

6. The package of claim 5, wherein the first panel, second panel, and third panel are arranged generally in a Z-configuration.

7. The package of claim 5, wherein the second panel and the third panel are coupled to one another via a fold line that defines the second edge.

8. The package of claim 1, wherein the first panel and the second panel are each generally rectangular and having a pair of long edges and a pair of short edges, and wherein the first edge is a short edge and the second edge is a short edge.

9. A package comprising:
   a container defining a chamber, the chamber having a dispensing portion;
   an insert positioned within the chamber, the insert including a first panel having an A side, a B side opposite the A side, and a first edge spaced away from the dispensing portion, the insert also including a second panel having a C side and a D side, the D side opposite the C side and facing the B side of the first panel, the second panel defining a passage extending between the C side and the D side, the second panel defining a second edge positioned on an opposite side of the passage as the first edge;
   a serpentine floss guide path defined by the container, the first panel, and the second panel, the serpentine floss guide path extending from the dispensing portion, along the A side, around and over the first edge from the A side of the first panel to the C side of the second panel, through the passage from the C side of the second panel to the D side of the second panel, and around and over the second edge; and
   a plurality of pre-cut lengths of floss carried by the insert and positioned in the chamber, each length of floss extending along the serpentine floss guide path and having an end positioned at the dispensing portion.

10. The package of claim 9, wherein the first panel defines a gathering member between the first edge and the dispensing portion, and wherein the serpentine floss guide path extends through the gathering member.

11. The package of claim 10, wherein the gathering member includes an opening through which each of the plurality of lengths of floss passes.

12. The package of claim 9, wherein the first panel and the second panel are coupled to one another via a fold line that defines the first edge.

13. The package of claim 9, wherein the insert includes a third panel having an E side and an F side, the E side facing the C side and the F side opposite the E side, and wherein the floss guide path extends from the D side and around the second edge to the F side.

14. The package of claim 13, wherein the first panel, second panel, and third panel are arranged generally in a Z-configuration.

15. The package of claim 13, wherein the second panel and the third panel are coupled to one another via a fold line that defines the second edge.

16. The package of claim 9, wherein the first panel and the second panel are each generally rectangular and having a pair of long edges and a pair of short edges, and wherein the first edge is a short edge and the second edge is a short edge.

\* \* \* \* \*